Aug. 3, 1948.    W. L. PLAXCO    2,446,432
JUICE EXTRACTOR
Filed Dec. 22, 1945
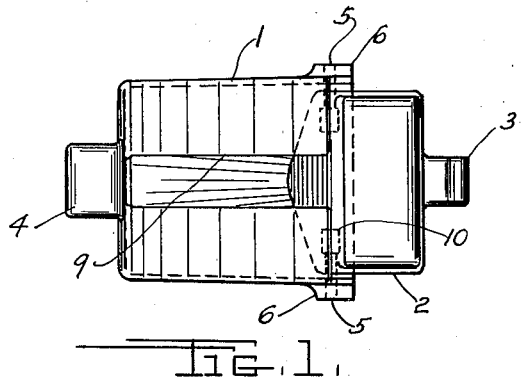
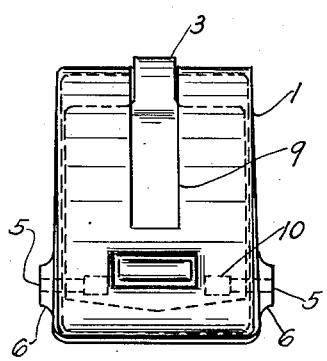
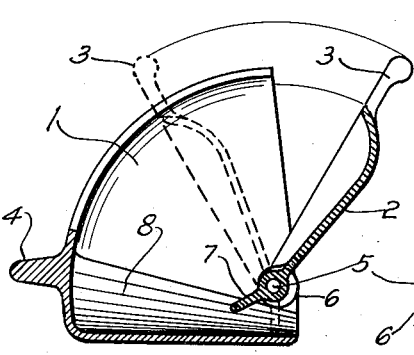
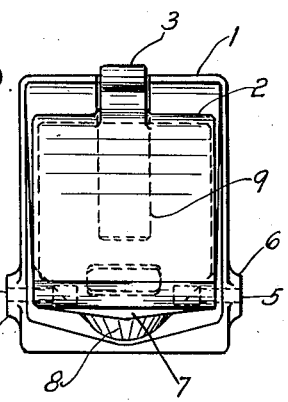
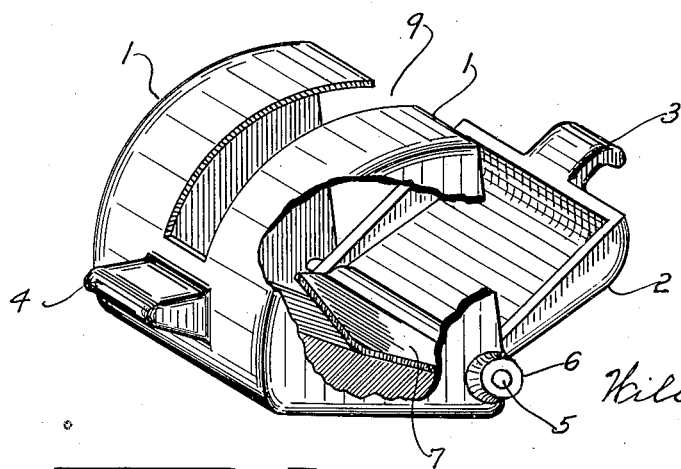
William L. Plaxco
INVENTOR.
BY Chas. Denegre
ATTORNEY Patented Aug. 3, 1948

2,446,432

UNITED STATES PATENT OFFICE 2,446,432

JUICE EXTRACTOR

William L. Plaxco, Russellville, Ala.

Application December 22, 1945, Serial No. 636,784

2 Claims. (Cl. 100—41)

This invention relates to a juice extractor, especially for extracting the juice from a piece of lemon. The main object of the invention is to provide a simple and highly efficient small device to be used in extracting juice from a piece of lemon or similar article.

It is well known that when a little lemon juice is wanted in tea, on fish or any other article of food, it is inconvenient and a nuisance to obtain the juice from the piece of lemon by use of the fingers, and in many instances the juice squirts in all directions.

The present invention is for use in connection with a meal or tea party and provides a small simple inexpensive compressor that will extract the juice, deliver it in a small stream or trickle and prevent it from squirting in all directions.

Other advantages will appear from the drawing and description.

By referring in general to the drawing, constituting a part of this application, it will be observed that Fig. 1 is a top plan view of the juice extractor; Fig. 2 is a central vertical sectional view; Fig. 3 is an end view of Fig. 2; Fig. 4 is an opposite end view of Fig. 2; and Fig. 5 is a perspective view of the extractor in open position.

Similar reference numerals refer to similar parts throughout the several views.

Referring to the drawing in detail it will be seen that the device comprises a main body 1 with a flat bottom and a curved top and a swingable front curved cover 2. The main body is provided with an extension as a thumb handle 4 integral with its lower rear wall, and a slot 9 extending through the center of its curved top from the top front to a point near the rear thumb handle. The main body has a thick bottom in its rear portion that converges into a trough 8 that slopes toward the front edge of the bottom where the juice runs out. The swingable front member 2 is also provided with a handle 3 that also acts as a guide to travel in the slot 9 of the main body. Integral with the front is a lower extension 7 that is adapted to travel along in the front portion of the trough 8 of the main body. The two parts are held swingably together by means of pins 5 that fit into corresponding holes in the swingable member and the reenforced portions 6 of the main body. These pins are inserted from the inside or outside depending on the design.

From the foregoing it will appear that to use the extractor a piece of lemon cut in the shape of a wedge comprising one eighth of a lemon is placed in the main body with the peel toward the back of the main body and juice cells toward the swingable front. Then the thumb of the right hand is placed under the body handle 4 with a finger around the front handle 3 and the parts are pulled together with the handle of the front traveling in the slot of the main body, thus compressing the piece of lemon resulting in its juice flowing out of the lower front edge of the main body. Any shape piece of lemon or grapefruit or orange may be compressed in the extractor because the curved cup shape of the front confines the piece so that it cannot get out while the front is being closed toward the end of the slot in the main body.

The extractor may be made of any material best suited for the purpose, but I prefer to make it of plastic material of different colors.

While I have shown and described the preferred embodiment of my invention, I do not wish to limit same to the exact and precise details of structure, but reserve the right to make all modifications and changes so long as I remain within the spirit and scope of the following claims.

Having described my invention I claim:

1. A lemon juice extractor of the class described comprising; a main body with a flat bottom and a curved top, and having the front end open, a thumb handle integral with the rear lower portion of the body, a trough integral with the inner bottom of the body and converging toward the front lower open end of the body and sloping downward and becoming narrow, a slot in the top of the body; a front curved cover adapted to fit within the open end of the main body, a handle and guide combined and integral with the top end of the curved cover, the guide portion adapted to fit and travel in the slot in the top of the main body, and pin hinges for holding the main body and cover swingably attached together, the cover adapted to fit into the main body and by manual operation compress a soft substance placed within the main body such substance being a piece of lemon.

2. A juice extractor of the class described comprising; a main body having a flat outer bottom and a curved top, and having the front end open, a thumb handle integral with the outer rear lower portion of the body, a trough integral with the inner bottom of the body and converging toward the front lower open end of the body and sloping downward and becoming narrow, a slot in the top of the body; a front curved cover adapted to fit within the open end of the main body, a handle and guide combined and integral with the top end of the curved cover, the guide portion adapted to fit and travel in the slot in the top of the main body, and pin hinges for holding the main body and cover swingably attached together, the cover adapted to fit into the main body and by manual operation form compressing means between its inner face and the bottom of the main body to thus compress a soft substance positioned within the body.

WILLIAM L. PLAXCO.

REFERENCES CITED

The following references are of record in the file of this patent:

UNITED STATES PATENTS

| Number | Name | Date |
|---|---|---|
| 2,037,553 | Wagner | Apr. 14, 1936 |